(12) United States Patent
Oishi et al.

(10) Patent No.: US 8,130,460 B2
(45) Date of Patent: Mar. 6, 2012

(54) APPARATUS AND METHOD FOR WRITING DATA ON A TAPE MEDIUM

(75) Inventors: Yutaka Oishi, Yamato (JP); Hirokazu Nakayama, Yamato (JP); Setsuko Masuda, Yamato (JP); Kenji Nakamura, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 112 days.

(21) Appl. No.: 12/534,892

(22) Filed: Aug. 4, 2009

(65) Prior Publication Data
US 2010/0033869 A1    Feb. 11, 2010

(30) Foreign Application Priority Data

Aug. 5, 2008   (JP) ................................ 2008-202309

(51) Int. Cl.
*G11B 19/04*    (2006.01)

(52) U.S. Cl. ... 360/60; 360/73.04; 360/74.1; 360/77.12; 360/48

(58) Field of Classification Search .................. 360/60, 360/70, 73.01, 73.03, 73.04, 77.12, 78.04
See application file for complete search history.

(56) References Cited

U.S. PATENT DOCUMENTS

| | | | |
|---|---|---|---|
| 5,892,633 A * | 4/1999 | Ayres et al. ................ | 360/73.08 |
| 6,856,479 B2 | 2/2005 | Jaquette et al. | |
| 6,865,043 B2 | 3/2005 | Ataku et al. | |
| 6,898,036 B2 * | 5/2005 | Gill et al. ........................ | 360/53 |
| 6,950,257 B1 * | 9/2005 | Greco et al. .................... | 360/48 |
| 7,119,974 B2 * | 10/2006 | Jaquette ........................ | 360/46 |
| 7,236,322 B2 * | 6/2007 | Greco et al. .................... | 360/75 |
| 7,535,664 B1 * | 5/2009 | Gill ................................. | 360/50 |
| 7,631,141 B2 * | 12/2009 | Watanabe ...................... | 711/111 |
| 8,035,912 B2 * | 10/2011 | Katagiri et al. ............. | 360/73.08 |
| 2005/0041317 A1 * | 2/2005 | Jaquette ........................ | 360/46 |
| 2005/0088771 A1 * | 4/2005 | Jaquette et al. ............. | 360/73.04 |
| 2007/0053091 A1 * | 3/2007 | Shiratori .......................... | 360/8 |

* cited by examiner

*Primary Examiner* — Dismery Mercedes
(74) *Attorney, Agent, or Firm* — Adam M. Steadman; Cynthia G. Seal

(57) ABSTRACT

An apparatus and method are disclosed for writing data accumulated in a buffer on a tape medium in such a way that overwriting is prevented. The apparatus comprises a write unit configured for writing first data in a first position extending over a first track and an area adjacent to the first track, writing second data in a second position extending over a second track and an area adjacent to the second track, and writing the first data and the second data in a third position extending over a third track and an area adjacent to the third track. Furthermore, the apparatus comprises a processing unit configured for preventing the first data written in the first position from being overwritten with the second data written in the second position or with the first data written in the third position.

18 Claims, 12 Drawing Sheets

FIG. 3

| NORMAL WRAP | BAND | ABF WRAP |
|---|---|---|
| 0 - 9 | 0 | 12, 13 |
| 14 - 23 | 1 | 26, 27 |
| 28 - 37 | 2 | 40, 41 |
| 42 - 51 | 3 | 54, 55 |
| 52 - 55 | 3 | 26, 27 |
| 38 - 41 | 2 | 12, 13 |
| 10 - 13 | 0 | 26, 27 |
| 24 - 27 | 1 | N/A |

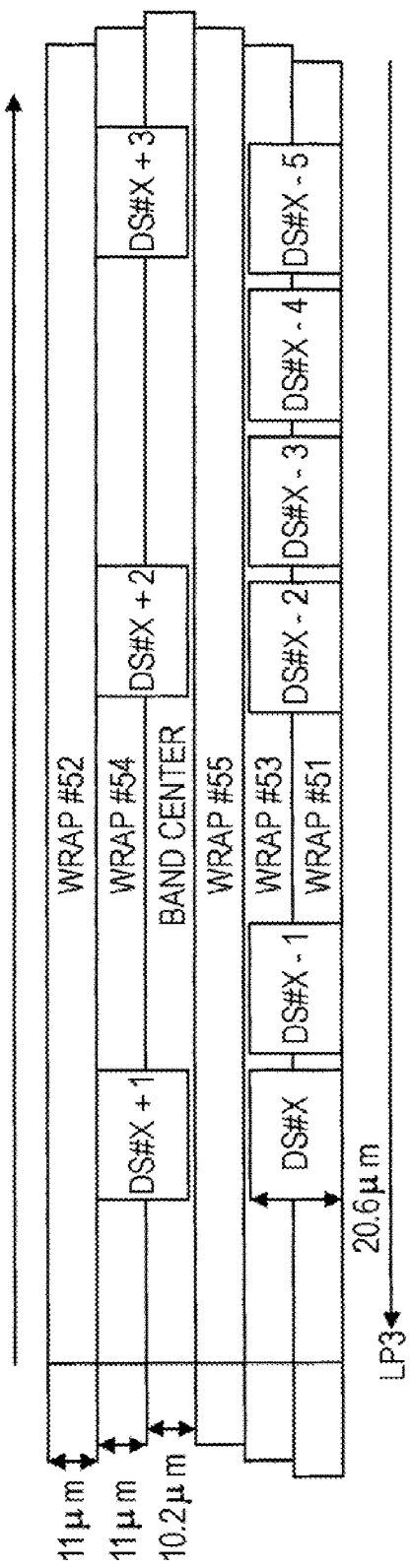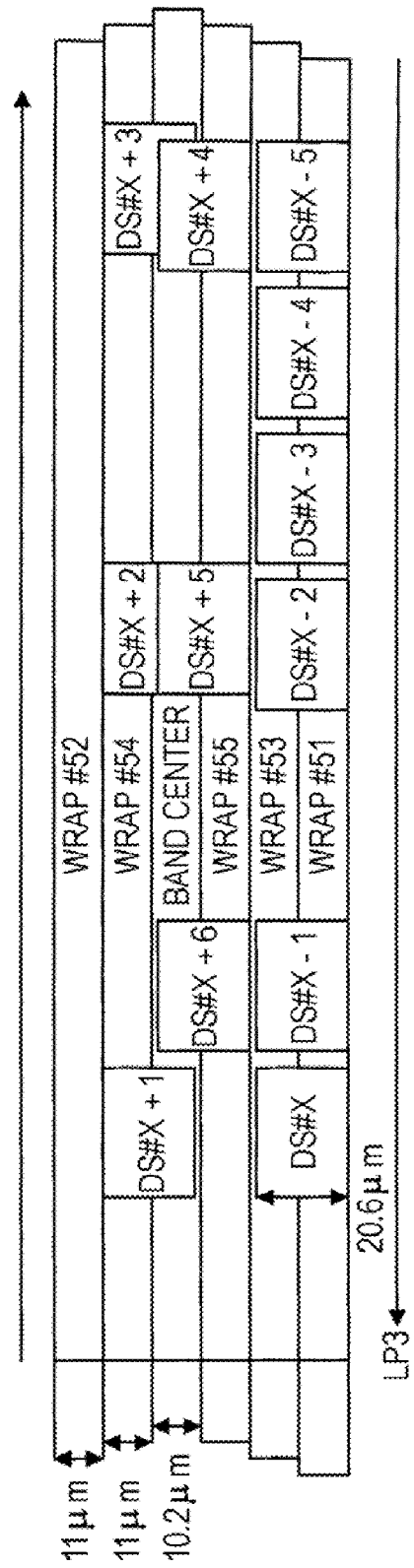

APPARATUS AND METHOD FOR WRITING DATA ON A TAPE MEDIUM

RELATED APPLICATION

This application claims priority under 35 U.S.C. §119 to Japanese Patent Application No. 2008-202309 filed Aug. 5, 2008, the entire text of which is specifically incorporated by reference herein.

TECHNICAL FIELD

The various embodiments described herein relate to an apparatus and a method for writing data on a tape medium. More specifically, the various embodiments relate to an apparatus and a method for writing data accumulated in a buffer on a tape medium.

RELATED ART

In general, a tape drive for writing data on a tape medium such as a magnetic tape temporarily accumulates data in a buffer and writes the data from the buffer onto a tape medium at a time appropriate for the drive. The write of data from a buffer onto a tape medium as described above is called a "flush."

Incidentally, if a host frequently requests the tape drive to perform a flush, back hitches occur, since the tape drive writes data sent from the host onto the tape medium each time a flush is performed. A "back hitch" refers to a series of operations in which the tape medium reduces its traveling speed, temporarily stops, travels in the reverse direction, and again travels in the original direction until it reaches a position in which subsequent data is to be written. At such position, the data is written onto the tape medium. A back hitch is performed to increase the recording density of the tape medium by reducing intervals between pieces of data to be written.

A back hitch takes approximately five seconds. Accordingly, if a flush is frequently performed, write performance is reduced.

For this reason, RABF (recursive accumulating backhitchless flush) has been proposed as a technology for avoiding such a reduction in performance. See, e.g., U.S. Pat. Nos. 6,856,479 and 6,865,043.

When RABF is being performed, data is written into a temporary recording area (i.e., ABF wrap), distinct from a normal recording area (i.e., normal wrap), without performing a back hitch even if a flush occurs. In other words, pieces of data are written at long intervals—i.e., at a low recording density. After a given amount of data is written into a temporary recording area, the temporarily written data is rewritten into a normal recording area. Such method curtails a reduction in performance at the time of a write even in an environment in which a flush frequently occurs.

SUMMARY OF THE INVENTION

The aforementioned RABF technology for avoiding a reduction in performance at the occurrence of a flush has been known. However, disadvantages may arise from known RABF technology. For example, U.S. Pat. Nos. 6,856,479 and 6,865,043 do not assume that since the width of a write head is larger than that of a track, data written on a track would extend over an area adjacent to the track. As a result, these related-art examples give no consideration to a problem scenario in which data written on a temporary recording area may be overwritten with other data written on the temporary recording area or data written on a normal recording area. As a result of such problem scenario, data written in the temporary recording area may become inaccessible.

Accordingly, an object of the various embodiments described herein is to avoid a problem involving data written in a temporary recording area being overwritten with other data written in the temporary recording area or data written in a normal recording area.

According to a first aspect of the various embodiments described herein, an apparatus for writing data accumulated in a buffer on a tape medium is provided. The apparatus comprises a write unit configured for writing first data accumulated in the buffer on the tape medium in a first position extending over a first track and an area adjacent to the first track, writing second data accumulated in the buffer on the tape medium in a second position extending over a second track and an area adjacent to the second track, and writing the first data and the second data in a third position extending over a third track and an area adjacent to the third track. The apparatus further comprises a processing unit configured for preventing the first data written in the first position by the write unit from being overwritten with the second data written in the second position by the write unit and or with the first data written in the third position by the write unit. The first track and the second track are used for temporary data, and the third track is used for normal data. Moreover, the first track and the second track are tracks for writing data without causing a back hitch.

In accordance with a first technique for overwrite prevention, the second track is interposed between an area adjacent to the first track and a fourth track, the fourth track being used subsequent to the third track. The fourth track is used for normal data. The processing unit further is configured for setting the second position at a position extending over the second track and the fourth track. In addition, the apparatus further may comprise a read unit configured for reading out data from an area adjacent to the first track in accordance with a request for reading out data from the first track. Moreover, if the third position is a position extending over the third track and the first track, then the processing unit further may be configured for setting the second position at a position extending over the second track and the fourth track. Such technique may prevent the first data written in the first position from being overwritten with the second data written in the second position.

In accordance with a second technique for overwrite prevention, before the first data is written in the third position by the write unit, the processing unit may be further configured for determining whether the first data written in the first position by the write unit is to be overwritten with the first data written in the third position by the write unit. If it is determined that the first data written in the first position is to be overwritten with the first data written in the third position, then the processing unit further may be configured for reporting a write error. Such technique may prevent the first data written in the first position from being overwritten with the first data written in the third position.

According to a second aspect of the various embodiments described herein, another apparatus for writing data on a tape medium is provided. The apparatus comprises an acquisition unit configured for acquiring data to be written on the tape medium. The tape medium comprises at least a first track for writing data without causing a back hitch in a first direction; a second track for writing data without causing a back hitch in a second direction opposite to the first direction; a third track for writing data in the first direction, the third track being adjacent to the first track and on a side opposite to the second track; a fourth track for writing data in the second direction, the fourth track being used subsequent to the third track and being adjacent to the second track and on a side opposite to the first track; and a center area interposed between the first track and the second track. The apparatus further comprises a positioning unit configured for positioning a write head at a first position extending over the first track and the center area and subsequently positioning the write head at a second position extending over the second track and the fourth track. The apparatus further comprises a write unit configured for writing the data acquired by the acquisition unit at the first position and subsequently at the second position by outputting the data to the write head.

According to a third aspect of the various embodiments described herein, a method for writing data accumulated in a buffer on a tape medium is provided. The method comprises writing first data accumulated in the buffer on the tape medium in a first position extending over a first track and an area adjacent to the first track; writing second data accumulated in the buffer on the tape medium in a second position extending over a second track and an area adjacent to the second track; writing the first data and the second data in a third position extending over a third track and an area adjacent to the third track; and preventing the first data written in the first position from being overwritten with the second data written in the second position or with the first data written in the third position. The first track and the second track are used for temporary data, and the third track is used for normal data. In addition, the first track and the second track are tracks for writing data without causing a back hitch.

In accordance with a first technique for overwrite prevention, the method further comprises interposing the second track between an area adjacent to the first track and a fourth track, wherein the fourth track is used subsequent to the third track and may be used for normal data. The method further comprises setting the second position at a position extending over the second track and the fourth track. The method further may comprise reading out data from an area adjacent to the first track in accordance with a request for reading out data from the first track. The method further may comprise setting the second position at a position extending over the second track and the fourth track if the third position is a position extending over the third track and the first track. Such technique may prevent the first data written in the first position from being overwritten with the second data written in the second position.

In accordance with a second technique for overwrite prevention, before the first data is written in the third position, the method further may comprise determining whether the first data written in the first position is to be overwritten with the first data written in the third position. If it is determined that the first data written in the first position is to be overwritten with the first data written in the third position, then the method further may comprise reporting a write error. Such technique may prevent the first data written in the first position from being overwritten with the first data written in the third position.

BRIEF DESCRIPTION OF THE DRAWINGS

The various embodiments described herein will be described in detail, with reference to the following figures, wherein:

FIG. 3 is a table showing an exemplary use order and assignment of normal wraps and ABF wraps that may be used for the tape of FIG. 2;

FIG. 4 is a diagram illustrating a problem occurrence in which a data set on an ABF wrap is overwritten;

FIG. 5 is a diagram further illustrating a problem occurrence in which a data set on an ABF wrap is overwritten;

DETAILED DESCRIPTION

By adopting the above-mentioned aspects, overwriting of data written in a temporary recording area with other data written in the temporary recording area or data written in a normal recording area may be prevented.

Figure 1:
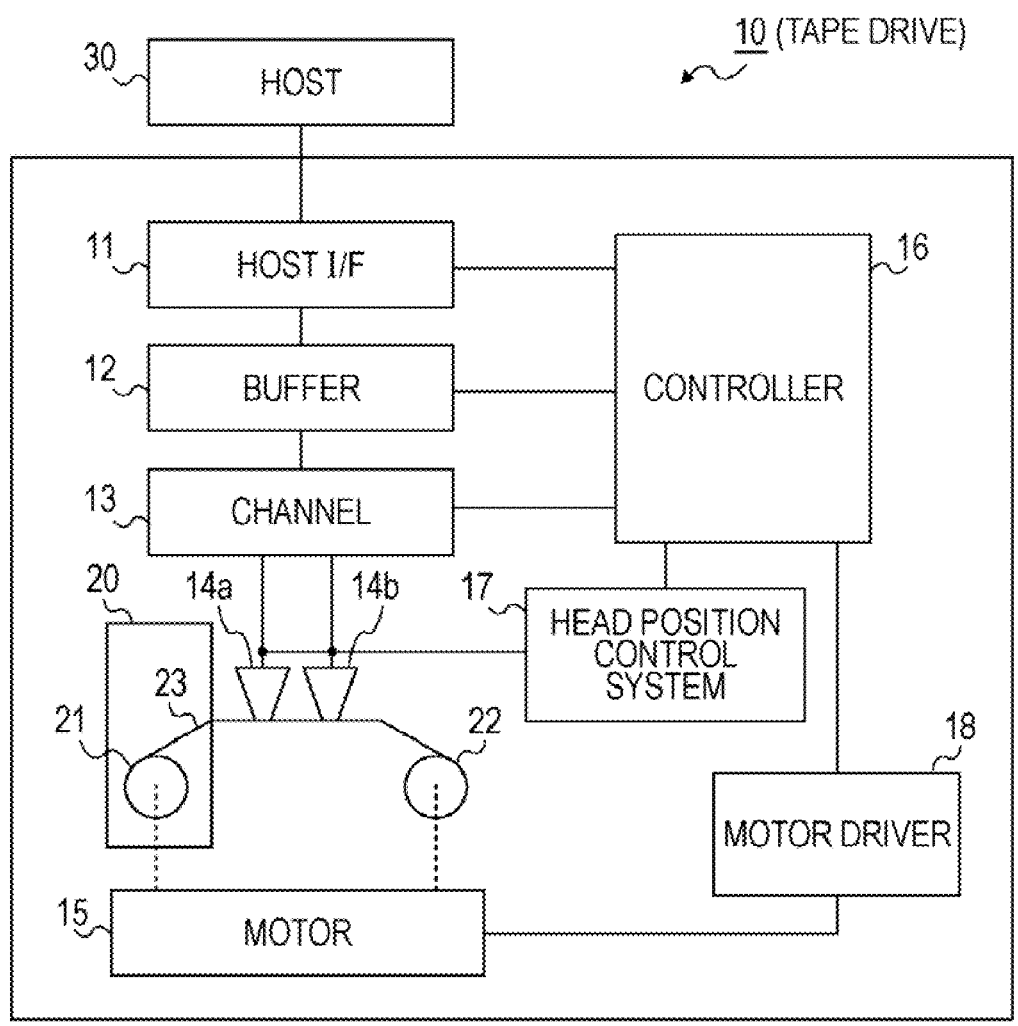
FIG. 1 is a diagram showing an exemplary configuration of a tape drive.

FIG. 1 is a diagram showing an example configuration of a tape drive 10. The tape drive 10 may be used in conjunction with the various embodiments described herein. The tape drive 10 comprises a host interface (hereafter referred to as a "host I/F") 11, a buffer 12, a channel 13, a write head 14a, a readout head 14b, and a motor 15. Also, the tape drive 10 comprises a controller 16, a head position control system 17, and a motor driver 18. A tape cartridge 20 loadable into the tape drive 10 is also shown in FIG. 1. The tape cartridge 20 comprises a tape 23 wound around reels 21 and 22. The tape 23 moves from the reel 21 to the reel 22 or from the reel 22 to the reel 21 in the longitudinal directions in accordance with the rotation of these reels. While a magnetic tape is provided as an example of the tape 23, a tape medium other than a magnetic tape may be used.

The host I/F 11 communicates with a host 30, which is an example of a higher-order apparatus. The host I/F 11 receives from the host 30 a command for writing data on the tape 23, a command for moving the tape 23 to an intended position, and/or a command for reading out data from the tape 23. The communication standards used by the host I/F 11 may be, e.g., SCSI (small computer system interface). In the event that SCSI communication standards are used, the aforementioned first command corresponds to a Write command, the second command corresponds to a Locate command or a Space command thereof, and the third command corresponds to a Read command thereof. The host I/F 11 sends a response back to the host 30 indicating whether a process corresponding to a command has succeeded or failed.

The buffer 12 is a memory for accumulating data to be written on the tape 23 or data read out from the tape 23. The buffer 12 may be, for example, a DRAM (dynamic random access memory). The buffer 12 comprises multiple buffer segments, each storing a data set. A data set is a unit for writing data on or reading data from the tape 23.

The channel 13 is a communication channel used when sending to the write head 14a data to be written on the tape 23 or receiving from the readout head 14b data read out from the tape 23. The write head 14a writes data on the tape 23 when the tape 23 moves in the longitudinal direction, while the readout head 14b reads out data from the tape 23 when the tape 23 moves in the longitudinal direction. The motor 15 rotates the reels 21 and 22. While the motor 15 is represented by one rectangle in FIG. 1, two motors 15 (e.g., one for the reel 21 and the other for the reel 22) may be provided.

The controller 16 controls the tape drive 10 as a whole. For example, the controller 16 controls the writing of data on the tape 23 or the readout of data therefrom in accordance with a command received by the host I/F 11. Also, the controller 16 controls the head position control system 17 and the motor driver 18. The head position control system 17 is a system for performing control so that the write head 14a or the readout head 14b tracks a desired one or more wraps. A "wrap" as provided herein refers to a group of multiple tracks on the tape 23. When the wrap must be changed to another, the write head 14a or readout head 14b must be electrically changed as well. Such a change is controlled by the head position control system 17. The motor driver 18 drives the motor 15. If two motors 15 are used as described above, two motor drivers 18 may be provided as appropriate.

Figure 2:
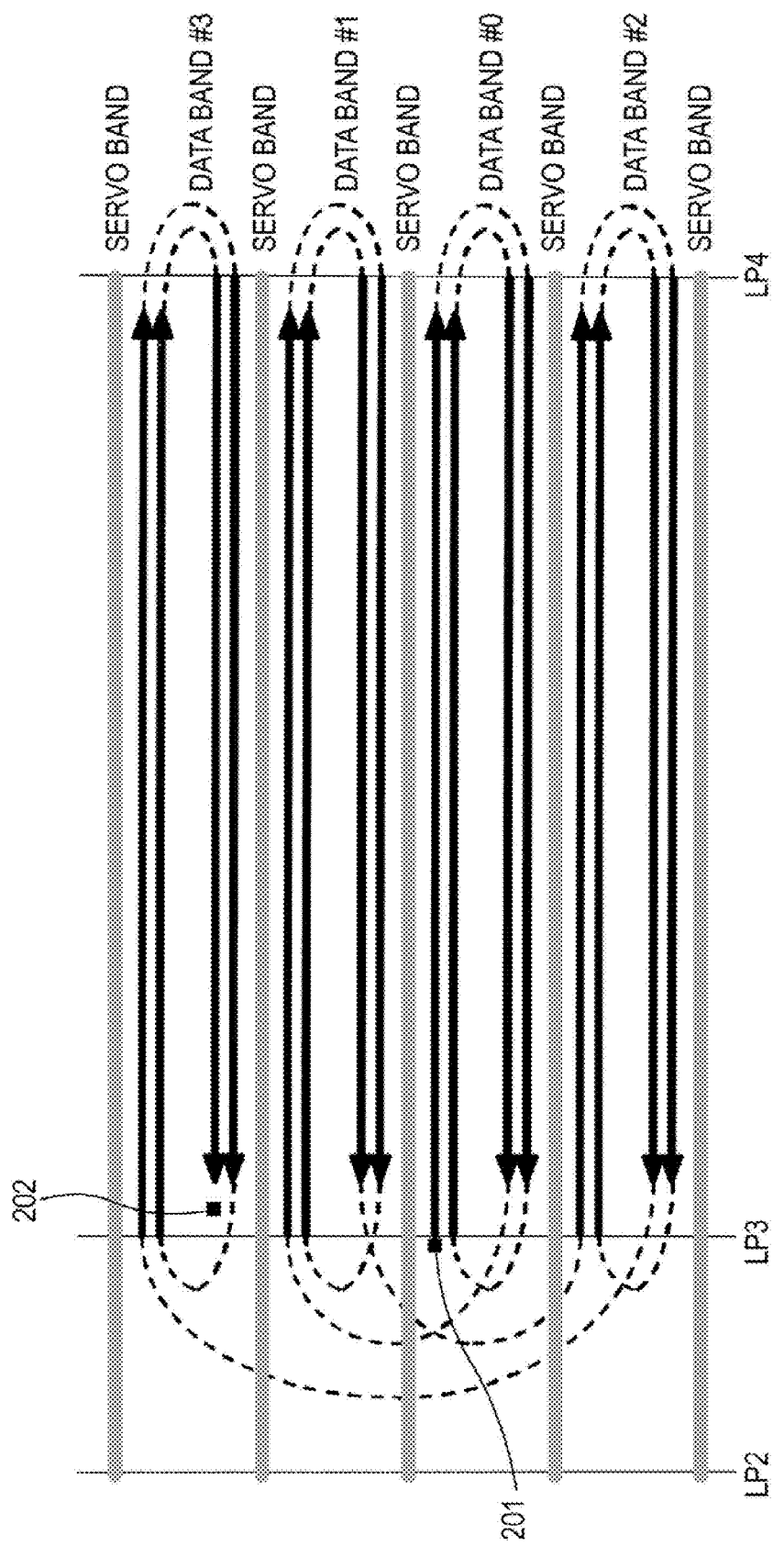
FIG. 2 is a drawing showing the format of a tape that may be used in conjunction with the tape drive of FIG. 1.

Hereafter, this example configuration will be described in detail using the IBM Enterprise Tape Drive TS1120 as an example of the tape drive 10. First, the format of the tape 23 will be described. FIG. 2 is a drawing showing an outline of the format of the tape 23. In FIG. 2, the area between an LP2 and an LP3 is a calibration area, and the area between an LP3 and an LP4 is a user data area. As shown in FIG. 2, five servo bands are provided on the tape 23. These servo bands are areas where servo patterns for indicating physical positions on the tape 23 are written when the tape 23 is manufactured.

The tape 23 is divided into four data bands by the five servo bands. These data bands are areas into which user data is written. Each data band comprises elongated data areas called wraps. In FIG. 2, one solid-line arrow represents one wrap. Data is read out from or written on a wrap in the forward direction as shown by a rightward arrow and then is read out from or written on a wrap in the reverse direction as shown by a leftward arrow linked to the rightward arrow by a dotted line. For the sake of simplification, FIG. 2 illustrates two wraps from or on which data is read out or written in the forward direction and two wraps from or on which data is read out or written in the reverse direction in one data band. However, there may be, e.g., seven to nine wraps each in the forward direction and the reverse direction in one data band in a spiral fashion. By reciprocating the tape 23 several times, data is repeatedly read out or written in the forward and reverse directions.

On the tape 23 having such a format, data is read out from or written on wraps disposed in a spiral fashion in data band #0 using a start position 201 as a start point. Subsequently, data is sequentially read out from or written on wraps disposed in a spiral fashion disposed in data bands #1, #2, and #3. Then, an end position 202 is reached. In this format, it takes approximately five seconds to move to a subsequent data band and, as a rule, after all wraps in one data band are used, the write or readout of data is started in a subsequent data band.

It should be noted that FIG. 2 is only a conceptual drawing, and accordingly the relation with the write head 14a or readout head 14b is not shown in the drawing. The tape drive 10 typically comprises multiple write heads 14a and readout heads 14b. For example, a solid-line arrow in FIG. 2 corresponds to a track left when one write head 14a or readout head 14b reads out or writes data. If a rightward arrow indicates a forward direction track corresponding to the first write head 14a and readout head 14b, forward direction tracks corresponding to the second, third, and later write heads 14a and readout heads 14b are sequentially disposed below such track. Similarly, if a leftward arrow indicates a reverse direction track corresponding to the first write head 14a and readout head 14b, reverse direction tracks corresponding to the second, third, and later write heads 14a and readout heads 14b are sequentially disposed below such track.

In the tape format of the second-generation Enterprise, each data band comprises fourteen wraps. Among such wraps, even number wraps are used when data is read out or written in a direction from the top (LP3 in FIG. 2) of the tape to the end (LP4 in FIG. 2) thereof—i.e., in the forward direction. Conversely, odd number wraps are used when data is read out or written in a direction from LP4 to LP3—i.e., in the reverse direction. As shown in FIG. 2, wraps in each data band are used in a spiral fashion; accordingly, a wrap adjacent to wrap #2 is wrap #0 or #4 rather than wrap #1 or #3.

Incidentally, the order of wraps used as normal wraps when data is written from the top of the tape 23 is predetermined. Such an order is shown in a table format in FIG. 3. Wraps with numbers shown in the "NORMAL WRAP" column of the table are used as normal wraps sequentially from those in the top row. Here, after wraps #0, #1, #2, . . . #9 are used, wrap #14 rather than wrap #10 is used. Also, in each data band, two wraps adjacent to the center of the data band are used as ABF wraps. The ABF wraps are used when writing data using the RABF function without performing a back hitch. The ABF wraps are dynamically changed to others in accordance with the change of normal wraps used when writing data. For example, in accordance with FIG. 3, when wraps #0 to #9 are used as normal wraps, wraps #12 and #13 are used as ABF wraps. Moreover, when wraps #14 to #23 are used as normal wraps, wraps #26 and #27 are used as ABF wraps.

In each data band, wraps adjacent to ABF wraps serve as guard band wraps. In some cases, the write head 14a is wider than the width (i.e., track pitch) of one wrap. This is because the track pitch varies with the format and because one write head 14a corresponds to multiple formats. In this case, if wrap #12 or #13 is used as an ABF wrap while writing data into wrap #10, a problem may occur. Specifically, when data written in the ABF wrap is rewritten on wrap #10, the write head 14a having a width wider than the track pitch may overwrite the data written on wrap #12, since wrap #12 is adjacent to wrap #10. In order to avoid such problem, wraps adjacent to ABF wraps are reserved as guard band wraps.

However, even when using guard band wraps, a problem may occur under certain conditions when using the RABF function, and such problem may result in data being overwritten. Such problem occurs when all of the following conditions are satisfied:

When data written on the ABF wrap is rewritten onto an original normal wrap, the end of the original normal wrap (EOW: end of wrap) is reached, and an operation for moving to a subsequent normal wrap (i.e., wrap turn) is performed.

The subsequent normal wrap after the wrap turn is a guard band wrap of the ABF wrap being used at that time—i.e., the original normal wrap is any one of wraps #51, #41, and #13.

When data written on the ABF wrap is rewritten on the subsequent normal wrap, one or more errors occur, and the rewrite fails.

Data is written between the top of the ABF wrap and the position thereof where the above-mentioned error has occurred.

A data set including the same data as data included in an overwritten data set on the ABF wrap has not been written yet on the original normal wrap or the subsequent normal wrap.

A data set having the same contents as those of an overwritten data set on the ABF wrap has not been written yet on the same ABF wrap as a data set having overwraps. More specifically, when a flush is performed, a data set is written on the ABF wrap even if all pieces of data constituting the data set are not prepared at that time, and when a subsequent flush is performed, data is added to the data set and the resultant data set is written on the ABF wrap. This means that the data set having overwraps is written on the ABF wrap. However, the overwritten data is not included even in such overwraps.

Generally, if an error occurs when data is written, the data cannot be read out. However, once data is written on an ABF wrap during performance of the RABF function, the host 30 is notified that the data has been successfully written. Therefore, even if a write of data written on the ABF wrap onto a normal wrap subsequently fails, the data written on the ABF wrap must be capable of being read out. However, the aforementioned overwrite problem may render the data written on the ABF wrap incapable of being properly read out.

Figure 6:
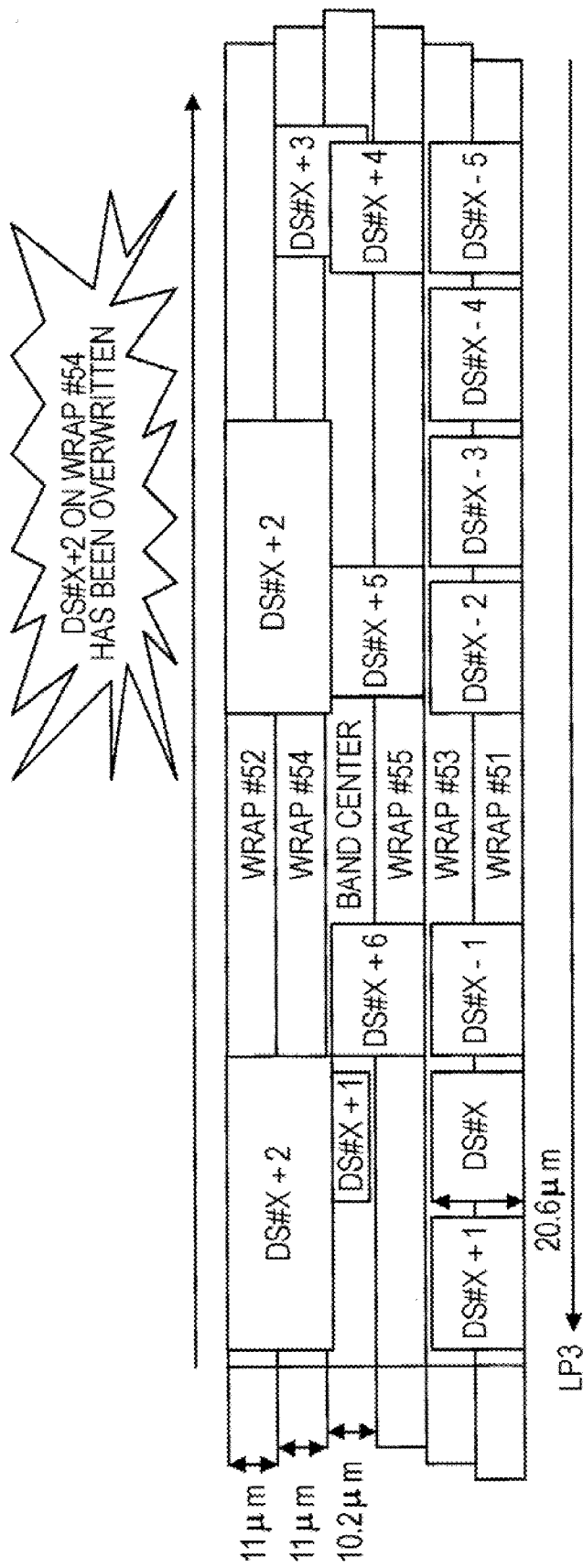
FIG. 6 is a diagram further illustrating a problem occurrence in which a data set on an ABF wrap is overwritten.

Hereafter, specific examples of overwrite problem occurrences will be described. FIGS. 4 to 6 are drawings providing examples of problem occurrences. In the tape format of the second-generation Enterprise, the track pitch is 11 μm. There is a width of 10.2 μm (hereafter referred to as the "band center") between the last even wrap and last odd wrap located at the center of each data band. In these drawings, "DS" represents a data set. Since the width of the write head 14a of the IBM Enterprise Tape Drive TS1120 is 20.6 μm, the size of a data set in the width direction is 20.6 μm as well.

As shown in FIG. 4, first, pieces of data (DS#X−5 to DS#X) are written on wrap #51 of the tape 23. Then, the RABF function is used on wrap #51, and pieces of data (DS#X+1 to DS#X+3) are written on wrap #54 (an ABF wrap).

Subsequently, during the write of the pieces of data on the ABF wrap, a wrap turn occurs. Accordingly, as shown in FIG. 5, pieces of data (DS#X+4 to DS#X+6) are written on wrap #55 (another ABF wrap).

Subsequently, as shown in FIG. 6, pieces of data (DS#X+1 to DS#X+6) written on the ABF wraps #54 and #55 are rewritten on wrap #51. Then, a wrap turn occurs, and the data write moves to wrap #52. Here, assume that when DS#X+2 is written on warp #52, an error occurs (resulting in an erroneous version of DS#X+2) and that even if the write of DS#X+2 is retried, an error occurs again (resulting in another erroneous version of DS#X+2). Consequently, DS#X+2 written on wrap #54 is completely overwritten with DS#X+5 written on wrap #55 and an erroneous version of DS#X+2 written on wrap #52 so that the error-free version of DS#X+2 written on wrap #54 no longer can be read out.

The following are various methods for preventing the aforementioned overwrite problem:

The RABF function is disabled in the respective latter halves of wraps #51, #41, and #13. The length of the tape 23 is 600 m to 800 m. The "latter half" begins at a point slightly over the 500 m mark of the tape 23. Note that this length depends on the size of the buffer 12 of the tape drive 10 and the intervals between the data sets.

The data write area of an ABF wrap is limited to the latter half of LP3—i.e., to an area slightly over 500 m distant from LP3.

The ABF wraps with respect to wrap #51 are changed from wraps #54 and #55 to wraps #40 and #41, and the ABF wraps with respect to wrap #41 are changed from wraps #12 and #13 to wraps #26 and #27. In addition, the RABF function is disabled in wrap #13.

However, the methods listed above have drawbacks, since these methods adversely affect the data write performance of the tape drive 10 at times when the host 30 frequently requests a flush. For example, if the RABF function is disabled, a back hitch occurs each time a flush is performed. In such case, the time required to write data becomes almost ten times longer than in a case where the RABF function is enabled.

Two techniques are proposed for preventing the aforementioned overwrite problem. Hereafter, the two techniques will be described while referring to one of the two as a first embodiment and to the other as a second embodiment.

First Embodiment

In accordance with the first embodiment, the write head 14a is offset toward the guard band wrap while writing data on the ABF wraps in the reverse direction so that the band center is not invalidated. By performing such offset operation, the data is read out from an area around the band center, even if the aforementioned overwrite problem occurs. Thus, the overwrite problem that occurs when the data written on the ABF wrap is rewritten on the normal wrap may be prevented without adversely affecting the data write performance of the tape drive 10 at times when the host 30 frequently requests a flush.

Figure 7:
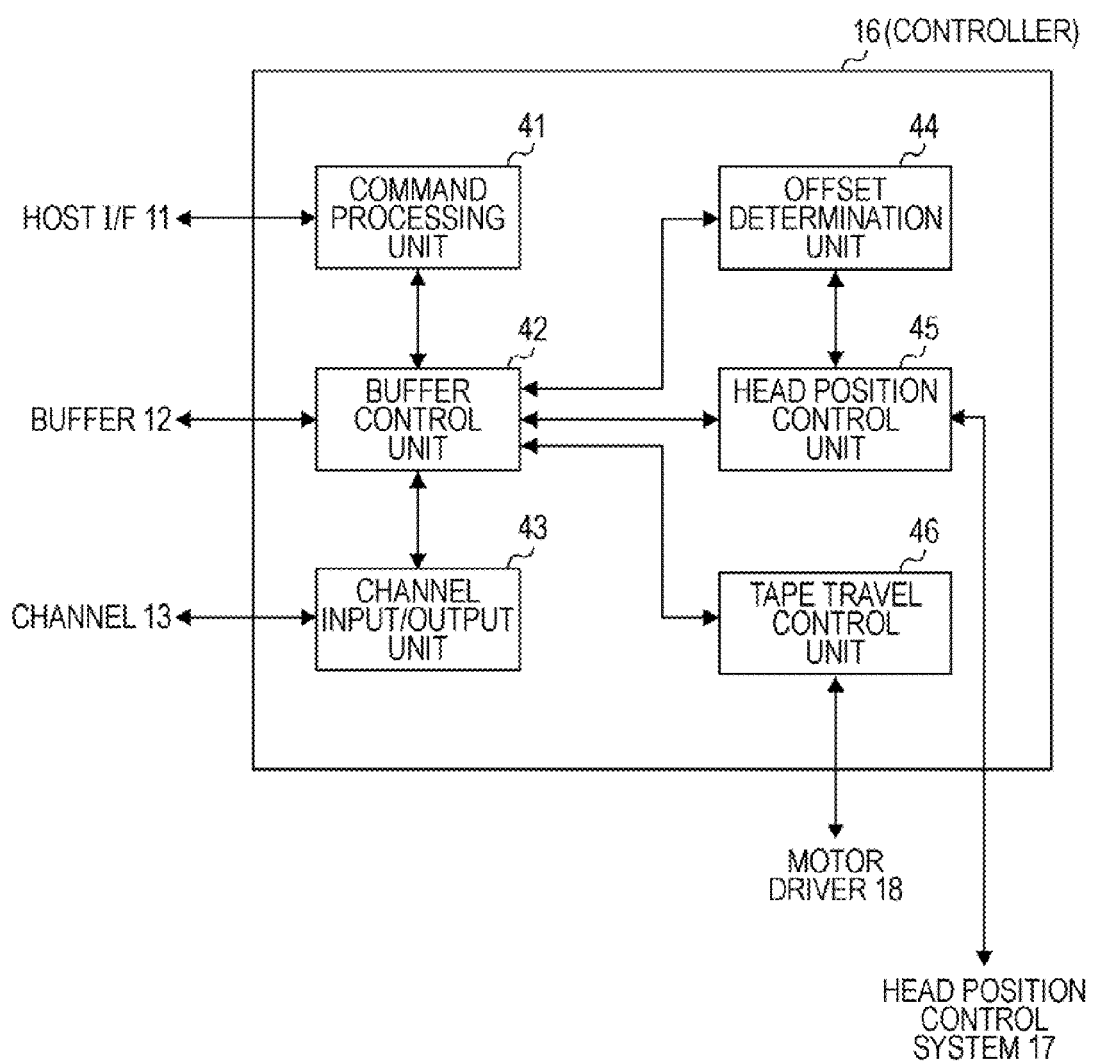
FIG. 7 is a block diagram showing an exemplary functional configuration of a tape drive controller in accordance with a first exemplary embodiment.

First, a functional configuration of the controller 16 for performing the offset operation will be described. FIG. 7 is a block diagram showing an example functional configuration of the controller 16. As shown in FIG. 7, the controller 16 comprises a command processing unit 41, a buffer control unit 42, a channel input/output unit 43, an offset determination unit 44, a head position control unit 45, and a tape travel control unit 46.

Among these components, the command processing unit 41 receives a command from the host I/F 11. Such commands include a Write command for storing data in the buffer 12, a synchronization command for writing data stored in the buffer 12 on the tape 23, and a Read command for reading out data from the tape 23. In accordance with the first embodiment, the command processing unit 41 is provided as an example of an acquisition unit configured for acquiring data to be written on a tape medium.

If the command processing unit 41 receives a Write command, the buffer control unit 42 prepares data in the buffer 12. If the command processing unit 41 receives a synchronization command, the buffer control unit 42 reads out data from the buffer 12 and outputs the read-out data to the channel input/output unit 43. If the command processing unit 41 receives a Read command, and if the target data does not exist in the buffer 12, the buffer control unit 42 instructs the channel input/output unit 43 to read out the data from the tape 23.

Conversely, if the target data exists in the buffer 12, the buffer control unit 42 sends back the data to the host 30 via the command processing unit 41.

The channel input/output unit 43 outputs to the channel 13 data read out from the buffer 12 by the buffer control unit 42 or outputs to the buffer control unit 42 data received from the channel 13. Also, the channel input/output unit 43 acquires from the channel 13 information indicating the position (LPOS) of the tape 23 in the longitudinal direction obtained by following a servo track using a servo head. In accordance with the first embodiment, the channel input/output unit 43 is provided as an example of a write unit for writing data.

When data is written, the offset determination unit 44 determines whether the write head 14a should be offset on the basis of information about the current wrap acquired from the head position control unit 45. When data is read out, the offset determination unit 44 determines whether the readout head 14b should be offset on the basis of information about the current wrap acquired from the head position control unit 45 and information about a readout error acquired from the buffer control unit 42. In accordance with the first embodiment, the offset determination unit 44 is provided as an example of a processing unit configured for preventing overwriting.

The head position control unit 45 outputs a signal to the head position control system 17 for moving the write head 14a or readout head 14b in the width direction of the tape 23. Also, the head position control unit 45 stores information indicating the current positions of the write head 14a and readout head 14b in the width direction of the tape 23. In accordance with the first embodiment, the head position control unit 45 is provided as an example of a positioning unit configured for positioning the write head. The tape travel control unit 46 outputs a signal to the motor driver 18 for causing the tape 23 to travel in the forward direction or the reverse direction.

Figure 8:
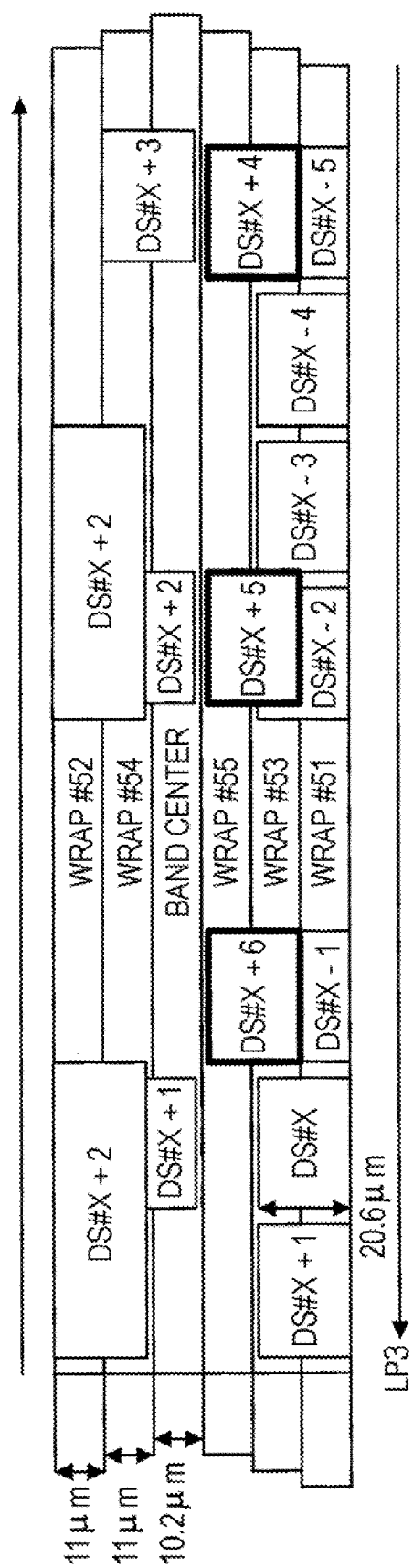
FIG. 8 is a diagram showing a technique according to the first exemplary embodiment for preventing a data set on an ABF wrap from being overwritten.

FIG. 8 shows a scenario in accordance with the first embodiment in which the tape drive 10 has offset the write head 14a toward the guard band wrap while writing data on the ABF wraps in the reverse direction so that the band center is not invalidated. As shown by the data sets surrounded by heavy lines in FIG. 8, the data sets written while offsetting the write head 14a in this way extend over wraps #53 and #55 rather than wrap #55 and the band center. Wrap #53 is a guard band wrap of the RABF; therefore, when data is written on the ABF wrap, the data also may be written on wrap #53. By writing data on the ABF wrap using such offset, the tape drive 10 can read out DS#X+2 written on the wrap #54 from an area around the band center.

In another exemplary configuration, if data sets are written on ABF wraps in the reverse direction using wraps #12 and #13 as the ABF wraps, the data sets extend over wraps #11 and #13. In another exemplary configuration, if wraps #26 and #27 are used as ABF wraps, the written data sets extend over wraps #25 and #27. In these exemplary configurations, wraps #11 and #25 respectively are guard band wraps of the RABF. Therefore, in accordance with the offset operation, if data sets are written on the ABF wrap in these exemplary configurations, the data sets also may be written on wraps #11 and #25 respectively.

In order to solve the aforementioned overwrite problem with respect to the tape format of the second-generation Enterprise of the IBM Enterprise Tape Drive TS1120, it is sufficient to offset the write head 14a while writing data on wrap #51, #41, or #13 only if the RABF function is used, as described above. Alternatively, the write head may be offset invariably while writing data.

Figure 9:
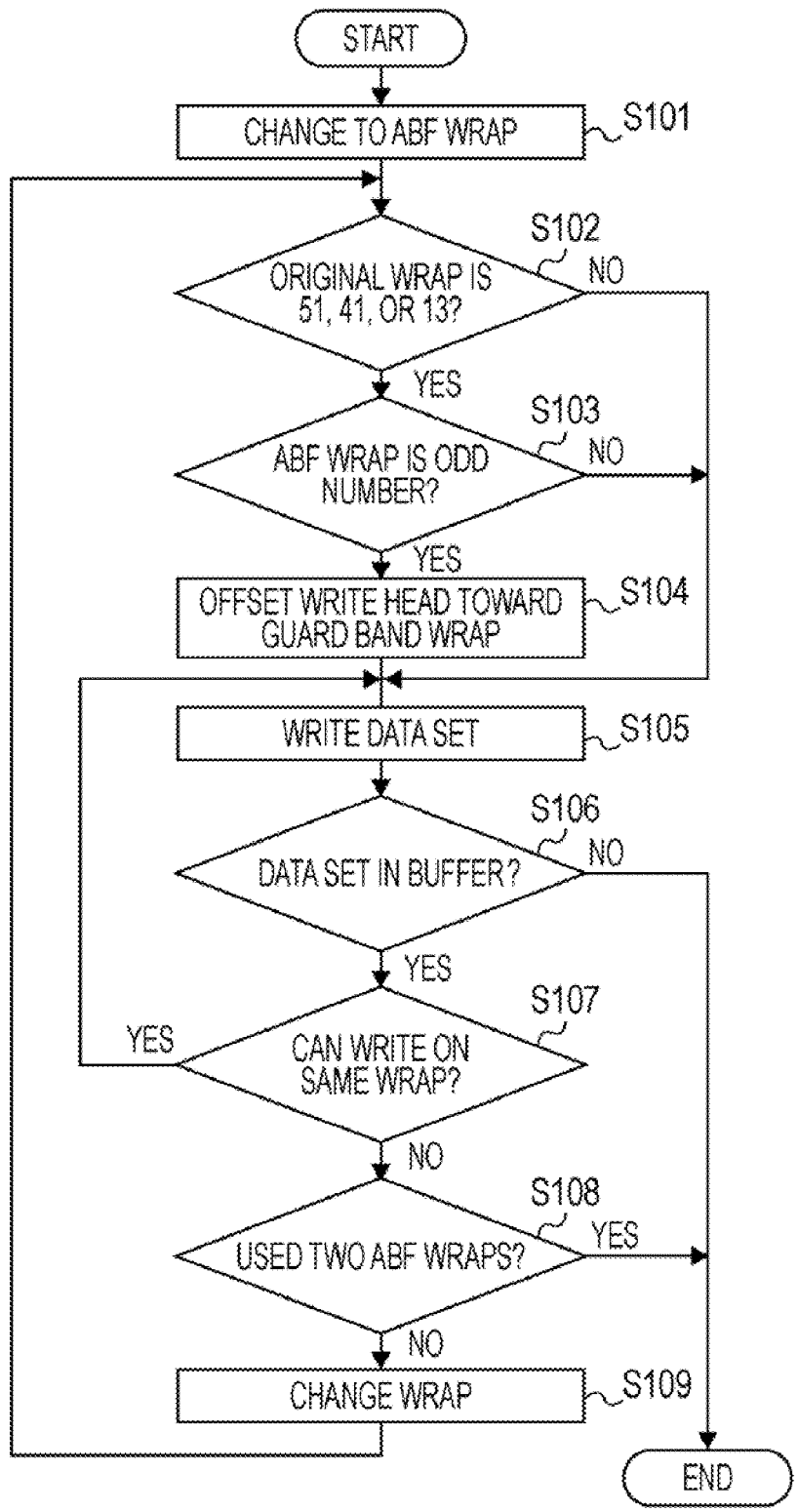
FIG. 9 is a flowchart showing example operations performed by a tape drive when a flush occurs in accordance with the first exemplary embodiment.

Hereafter, specific operations of the tape drive 10 in accordance with the first embodiment will be described. In the context of this description, it is assumed that offsetting of the write head is performed only when data is being written on wrap #51, #41, or #13 using the RABF function. First, operations of the tape drive 10 performed when a flush occurs will be described. FIG. 9 is a flowchart showing example operations of the tape drive 10 performed when a flush occurs. A flush occurs, for example, when a synchronization command for writing data stored in the buffer 12 on the tape 23 is sent from the host 30, or when the free space is lost in the buffer 12. That is, the tape drive 10 starts flush operations when the buffer control unit 42 is notified that the command processing unit 41 has received a synchronization command from the host 30 or when the buffer control unit 42 detects that the buffer 12 has become full.

First, the buffer control unit 42 instructs the head position control unit 45 to change the data write destination from a normal wrap to an ABF wrap, and the head position control unit 45 performs the change (step S101). More specifically, the head position control unit 45 outputs to the head position control system 17 a signal for positioning the write head 14a on an ABF wrap.

Subsequently, control is transferred from the head position control unit 45 to the offset determination unit 44. The offset determination unit 44 determines whether the original normal wrap is any one of wraps #51, #41, and #13 (step S102). It is preferable to make such determination on the basis of the wrap number held by the head position control unit 45 before changing the wrap. If it is determined that the original normal wrap is any one of wraps #51, #41, and #13, then it is determined whether the number of the ABF wrap is an odd number (step S103). It is preferable to make such determination on the basis of the current wrap number held by the head position control unit 45. If the number is an odd number, the offset determination unit 44 offsets the write head 14a toward the guard band wrap (step S104). More specifically, the offset determination unit 44 instructs the head position control unit 45 to output a signal to the head position control system 17 for offsetting the write head 14a toward the guard band wrap. Conversely, if the original normal wrap is a wrap other than wraps #51, #41, and #13, or if the number of the ABF wrap is an even number, then the offset determination unit 44 refrains from offsetting the write head 14a.

Subsequently, control is transferred from the head position control unit 45 to the buffer control unit 42, and the buffer control unit 42 writes a data set (step S105). More specifically, the buffer control unit 42 instructs the tape travel control unit 46 to output a signal to the motor driver 18 for causing the tape 23 to travel at a speed for writing data. Also, the buffer control unit 42 reads out a data set from the buffer 12 and passes the read-out data set to the channel input/output unit 43. Then, the channel input/output unit 43 writes the data set onto the tape 23 via the write head 14a. Subsequently, the buffer control unit 42 determines whether there is another data set in the buffer 12 (step S106). If it is determined in step S106 that there is no additional data set in the buffer 12, then the tape drive 10 completes the operations (END step). Conversely, if it is determined in step S106 that there is another data set in the buffer 12, then the buffer control unit 42 determines whether the data set can be written on the same wrap (step S107). More specifically, the buffer control unit 42 makes such determination on the basis of LPOS information about the current position acquired by the channel input/output unit 43. If the buffer control unit 42 determines that the data set can be written on the same wrap, then the process returns to step S105. Conversely, if the buffer control unit 42 determines that the data set cannot be written on the same wrap, then the buffer control unit 42 transfers control to the head position control unit 45, and the head position control unit 45 determines whether the two ABF wraps have been used completely (step S108). It is preferable to have stored the frequency of the change of a wrap and to make such determination on the basis of such change frequency. If the head position control unit 45 determines that the two ABF wraps have not been used completely, then it changes the ABF wrap (step S109). Specifically, the head position control unit 45 outputs a signal to the head position control system 17 for positioning the write head 14*a* on another ABF wrap. After the ABF wrap change, the process returns to step S102. Conversely, if it is determined that the two ABF wraps have been used completely, the tape drive 10 completes the operations (END step).

After a data set is written on an ABF wrap as described above, the data set is rewritten on a normal wrap at a predetermined time. The predetermined time may be, for example, the time when data sets have been written on one round trip of the ABF wrap, the time when the free space has been lost in the buffer 12, or the like. In accordance with the first embodiment, the operations of the tape drive 10 performed at the time of rewrite are the same as those performed at the time of rewrite realized by the current RABF function and thus will not be described in detail.

Figure 10:
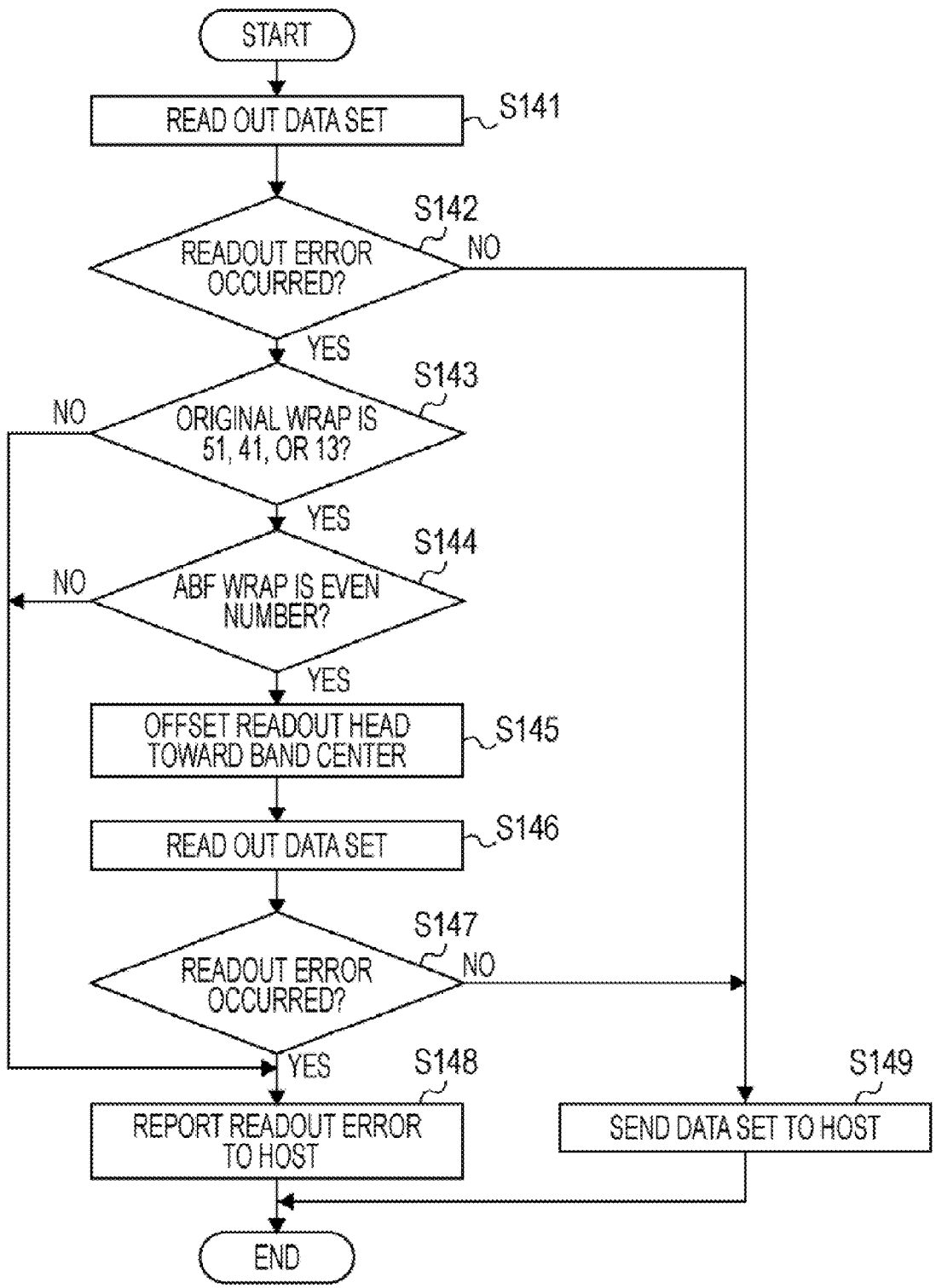
FIG. 10 is a flowchart showing example operations performed by a tape drive when data is read out in accordance with the first exemplary embodiment.

Next, the operations of the tape drive 10 performed when data is read out from an ABF wrap will be described in accordance with the first embodiment. FIG. 10 is a flowchart showing example operations of the tape drive 10 performed when data is read out. The readout of data from an ABF wrap is performed as a recovery process when the readout of the data from a normal wrap has failed. First, the buffer control unit 42 reads out a data set from an ABF wrap (step S141). More specifically, the buffer control unit 42 instructs the head position control unit 45 to output a signal to the head position control system 17 for positioning the readout head 14*b* on an ABF wrap. Moreover, the buffer control unit 42 instructs the tape travel control unit 46 to output a signal to the motor driver 18 for causing the tape 23 to travel at a speed for reading data. Furthermore, the buffer control unit 42 passes the data set read out by the channel input/output unit 43 to the buffer control unit 42 using the readout head 14*b*.

Then, the buffer control unit 42 determines whether an error has occurred when the data set is read out (step S142) If no readout error has occurred, then the process proceeds to step S149, discussed further herein. If an error occurs when the readout of the data set is first attempted, the readout may be retried, and if a readout error occurs again nonetheless, a readout error may be reported. More specifically, as will be described with reference to the steps provided below, by verifying whether the data set is properly decoded, the buffer control unit 42 determines whether a readout error with respect to the data set has occurred.

If in step S142 it is determined that a readout error has occurred, control is transferred from the buffer control unit 42 to the offset determination unit 44, and the offset determination unit 44 determines whether the original normal wrap is any one of wraps #51, #41, and #13 (step S143). Such determination preferably is made on the basis of the wrap number held by the head position control unit 45 before changing the wrap. If the offset determination unit 44 determines that the original normal wrap is not one of wraps #51, #41, and #13, then the process proceeds to step S148, discussed further herein. Conversely, if the offset determination unit 44 determines that the original normal wrap is any one of wraps #51, #41, and #13, then the offset determination unit 44 determines whether the number of the ABF wrap is an even number (step S144). Such determination preferably is made on the basis of the current wrap number held by the head position control unit 45. If the number of the ABF wrap is not an even number, then the process proceeds to step S148, discussed further herein. Conversely, if the number of the ABF wrap is an even number, then the offset determination unit 44 offsets the readout head 14*b* toward the band center (step S145). More specifically, the offset determination unit 44 instructs the head position control unit 45 to output a signal to the head position control system 17 for offsetting the readout head 14*b* toward the band center.

Subsequently, control is transferred from the head position control unit 45 to the buffer control unit 42, and the buffer control unit 42 reads out the data set (step S146). More specifically, the buffer control unit 42 instructs the tape travel control unit 46 to output a signal to the motor driver 18 for causing the tape 23 to travel at a speed for reading data. Moreover, the channel input/output unit 43 reads out the data set via the readout head 14*b* and passes the read-out data set to the buffer control unit 42.

Subsequently, the buffer control unit 42 determines whether an error has occurred when the data set is read out (step S147). More specifically, by verifying whether the data set is properly decoded, the buffer control unit 42 determines whether a readout error with respect to the data set has occurred.

If the buffer control unit 42 determines that a readout error has occurred, then it notifies the host 30 of the error (step S148). More specifically, the buffer control unit 42 notifies the command processing unit 41 that the data set cannot be read out, and the command processing unit 41 notifies the host 30 of the error.

In addition, as referred to above, if in step S143 it is determined that the original normal wrap is a wrap other than wraps #51, #41, and #13, or if in step S144 it is determined that the number of the ABF wrap is an odd number, then in step S148 the offset determination unit 44 notifies the host 30 that an error has occurred. More specifically, the buffer control unit 42 receives information indicating that the original normal wrap is a wrap other than wraps #51, #41, and #13 (from step S143) or information indicating that the number of the ABF wrap is an odd number (from step S144) and notifies the command processing unit 41 of the information. Then, the command processing unit 41 notifies the host 30 that an error has occurred.

If it is determined that no readout error has occurred in step S142 or step S147, then the buffer control unit 42 sends the data set to the host 30 (step S149). More specifically, the buffer control unit 42 accumulates the data set received from the channel input/output unit 43 in the buffer 12. Subsequently, the buffer management unit 42 reads out the data set in accordance with a readout command from the host 30 and sends the read-out data set to the host 30.

Second Embodiment

In accordance with the second embodiment, a data set written on an ABF wrap and having data that has yet to be rewritten on a normal wrap is prevented from being overwritten when the data set is rewritten on the normal wrap, paying attention to the end position (end LPOS) of each data set on the ABF wrap.

Specifically, the tape drive 10 stores in a ring buffer (a type of DRAM) the wrap number and LPOS information of the position where a data set has been written and the number of records or file marks included in the data set. The tape drive 10 updates the aforementioned information stored in the ring buffer at the time when the data set is written on an ABF wrap and/or at the time when the data set is rewritten from the ABF wrap on the normal wrap. When the data set once written on the ABF wrap is to be rewritten on the normal wrap, the tape drive 10 refers to the updated information to determine whether the rewrite should be performed. Accordingly, a data set having data that has yet to be rewritten on the normal wrap and that is among data sets written on the ABF wrap is prevented from being overwritten.

Figure 11:
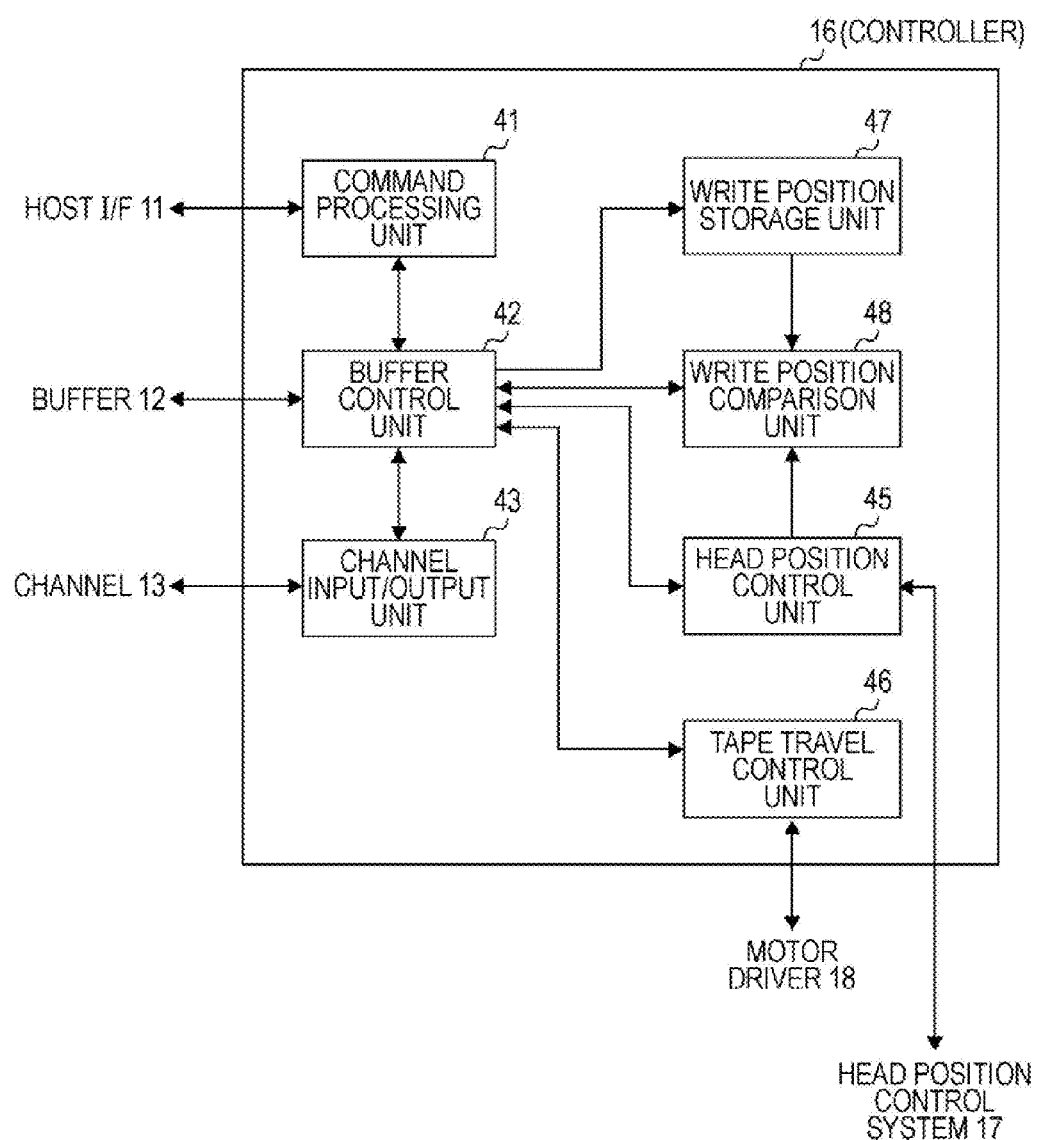
FIG. 11 is a block diagram showing an exemplary functional configuration of a tape drive controller in accordance with a second exemplary embodiment.

First, the functional configuration of the controller 16 for performing the aforementioned operations will be described in accordance with the second embodiment. FIG. 11 is a block diagram showing an example functional configuration of the controller 16. As shown in FIG. 11, the controller 16 comprises the command processing unit 41, the buffer control unit 42, the channel input/output unit 43, the head position control unit 45, the tape travel control unit 46, a write position storage unit 47, and a write position comparison unit 48.

Among these components, the command processing unit 41, buffer control unit 42, channel input/output unit 43, head position control unit 45, and tape travel control unit 46 have been already described herein with reference to FIG. 7.

The write position storage unit 47 stores the wrap number of the position where a data set is written for purposes of comparison to a wrap number held by the head position control unit 45. In addition, the write position storage unit 47 stores LPOS information indicating the position where the data set is written for purposes of comparison to LPOS information acquired by the channel input/output unit 43 in such a manner that these pieces of information are associated with the number of the data set managed by the buffer 12.

The write position comparison unit 48 determines whether the wrap number of the write position of the data set stored by the head position control unit 45 is equal to a wrap number stored in the write position storage unit 47 in such a manner that the latter wrap number is associated with the number of the data set. Moreover, the write position comparison unit 48 determines whether the LPOS information indicating the write position of the data set acquired by the channel input/output unit 43 is similar to LPOS information stored in the write position storage unit 47 in such a manner that the latter LPOS information is associated with the number of the data set. If the wrap numbers are equal to each other and if the pieces of LPOS information are similar to each other, then the write position comparison unit 48 notifies the buffer control unit 42 that the data set cannot be written. Otherwise, the write position comparison unit 48 instructs the buffer control unit 42 to write the data set. In accordance with the second embodiment, the write position comparison unit 48 is provided as an example of a processing unit configured for preventing overwriting.

Figure 12:
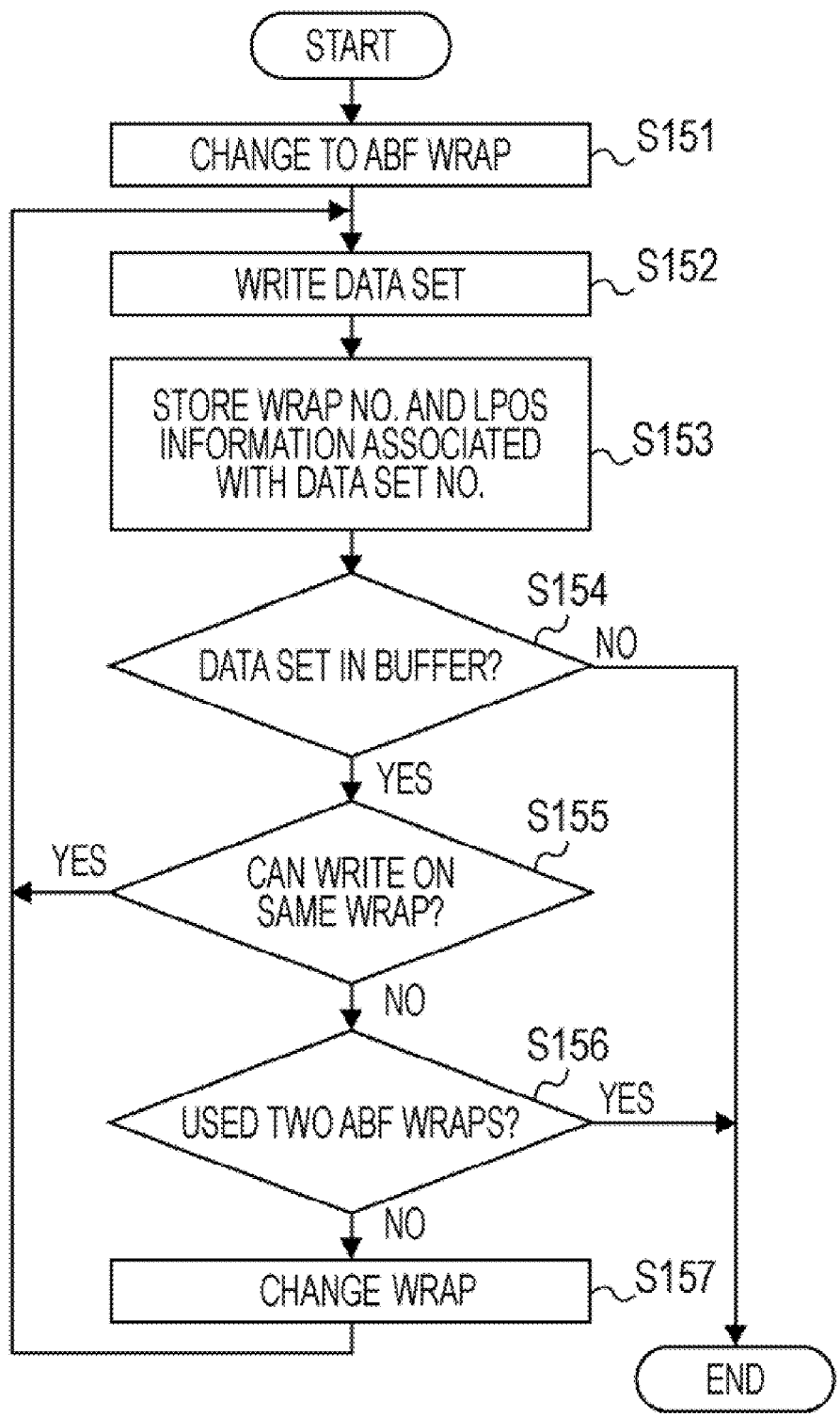
FIG. 12 is a flowchart showing example operations performed by a tape drive when a flush occurs in accordance with the second exemplary embodiment.

Hereafter, specific operations of the tape drive 10 will be described in accordance with the second embodiment. Here, assume that control is performed such that a data set written on an ABF wrap is prevented from being overwritten only when data is being written on one of original normal wraps #51, #41, or #13 using the RABF function. First, the operations of the tape drive 10 performed when a flush occurs will be described in accordance with the second embodiment. FIG. 12 is a flowchart showing example operations of the tape drive 10 performed when a flush occurs. A flush occurs, for example, when a synchronization command for writing data stored in the buffer 12 on the tape 23 is sent from the host 30, or when the free space is lost in the buffer 12. That is, the tape drive 10 starts the flush operations when the buffer control unit 42 is notified that that the command processing unit 41 has received a synchronization command from the host 30 or when the buffer control unit 42 detects that the buffer 12 has become full.

First, the buffer control unit 42 instructs the head position control unit 45 to change the data write destination from a normal wrap to an ABF wrap, and the head position control unit 45 performs such a change (step S151). More specifically, the head position control unit 45 outputs a signal to the head position control system 17 for positioning the write head 14*a* on an ABF wrap.

Subsequently, the buffer control unit 42 writes a data set (step S152). More specifically, the buffer control unit 42 instructs the tape travel control unit 46 to output a signal to the motor driver 18 for causing the tape 23 to travel at a speed for writing data. Moreover, the buffer control unit 42 reads out a data set from the buffer 12 and passes the read-out data set to the channel input/output unit 43. Then, the channel input/output unit 43 writes the data set on the tape 23 via the write head 14*a*.

At that time, the buffer control unit 42 acquires the wrap number of the position where the data set has been written from the head position control unit 45, acquires LPOS information indicating the position where the data set has been written from the channel input/output unit 43, and stores the number of the data set and the acquired pieces of LPOS information in the write position storage unit 47 in such a manner that the data set number and the pieces of information are associated with each other (step S153). Even if not all pieces of data constituting a data set are available at the time of a flush, available pieces of data are written on an ABF wrap, and at the time of a subsequent flush, data is added to the data set, and the resultant data set is written on the ABF wrap. In such case, the information stored comprises only the wrap number and LPOS information of the position where the largest number of pieces of the data set has been written. That is to say, the updated write position are stored in such a manner that these pieces of information are associated with the number of the data set.

Subsequently, the buffer control unit 42 determines whether there is an additional data set in the buffer 12 (step S154). If it is determined in step S154 that there is no additional data set in the buffer 12, then the tape drive 10 completes the operations (END step). Conversely, if it is determined that there is an additional data set in the buffer 12, then the buffer control unit 42 determines whether the data set can be written on the same wrap (step S155). The buffer control unit 42 makes such determination on the basis of LPOS information about the current position acquired by the channel input/output unit 43.

If in step S155 the buffer control unit 42 determines that the data set can be written on the same wrap, then the process returns to step S152. Conversely, if in step S155 the buffer control unit 42 determines that the data cannot be written on the same wrap, then the buffer control unit 42 transfers control to the head position control unit 45, and the head position control unit 45 determines whether the two ABF wraps have been used completely (step S156). It is preferable to have stored the frequency of the change of a wrap and to make such determination on the basis of such stored change frequency. If the head position control unit 45 determines that the two ABF wraps have not been used completely, then it changes the ABF wrap (step S157). More specifically, the head position control unit 45 outputs a signal to the head position control system 17 for positioning the write head 14*a* on another ABF wrap. After the ABF wrap change, the process returns to step S152.

Conversely, if it is determined that the two ABF wraps have been used completely, then the tape drive 10 completes the operations (END step).

Figure 13:
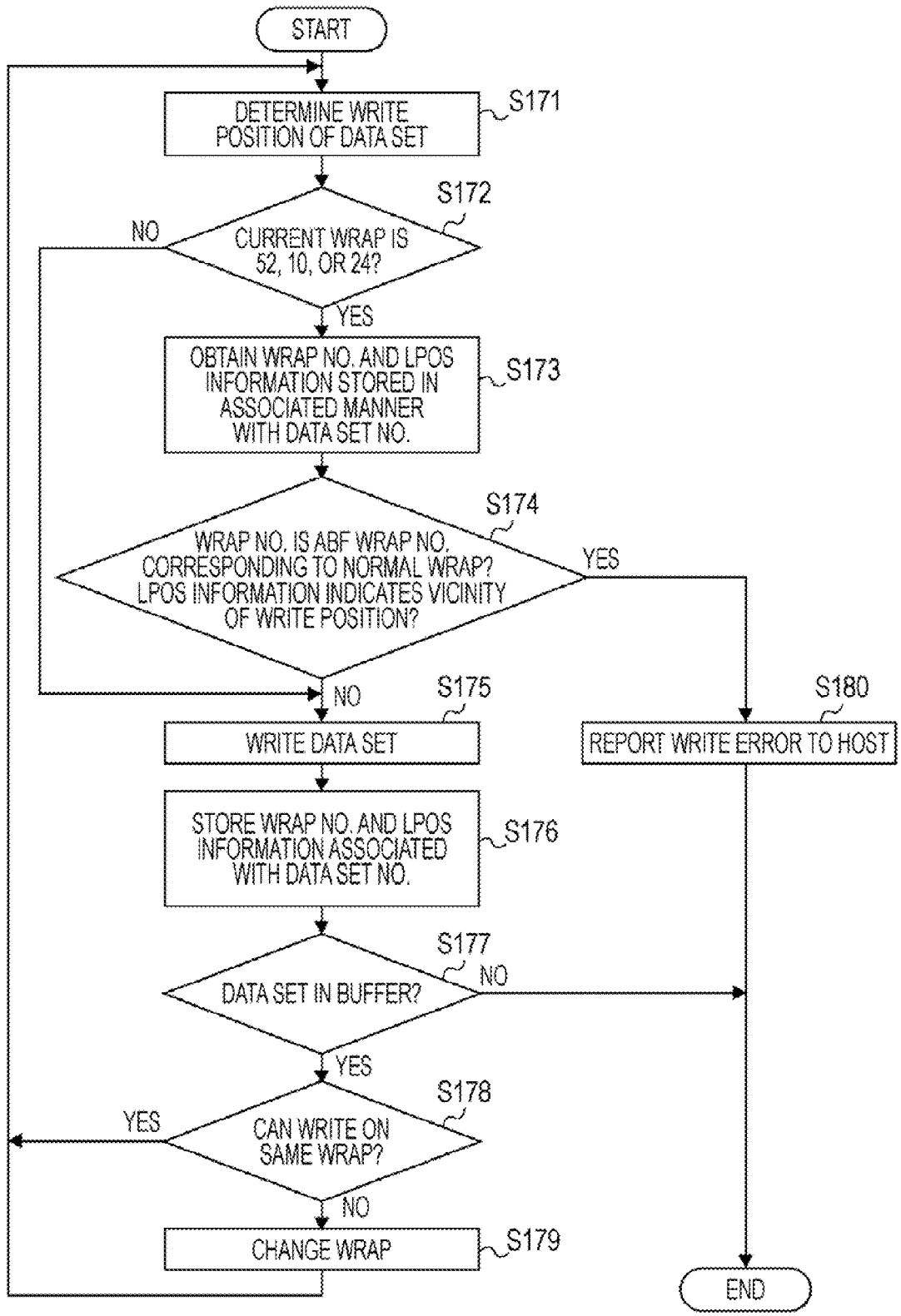
FIG. 13 is a flowchart showing example operations performed by a tape drive at the time of a rewrite in accordance with the second exemplary embodiment.

After a data set is written on an ABF wrap as described above, the data set is rewritten on a normal wrap at a predetermined time. FIG. 13 is a flowchart showing example operations of the tape drive 10 performed when the data set is rewritten in accordance with the second embodiment. The predetermined time may be, for example, the time when data sets have been written on one round trip of the ABF wrap, the time when the free space has been lost in the buffer 12, or the like. That is to say, the tape drive 10 may start the operations when the buffer control unit 42 is notified that that the head position control unit 45 has determined in step S156 of FIG. 12 that the two ABF wraps have been used completely or when the buffer control unit 42 detects that the buffer 12 has become full.

As shown in FIG. 13, the buffer control unit 42 determines the write position of a data set (step S171). For example, a position distant from the end of a preceding data set by a predetermined length preferably is determined as the write position. Subsequently, control is transferred from the buffer control unit 42 to the write position comparison unit 48, and the write position comparison unit 48 determines whether the current normal wrap is any one of the wraps #52, #10, and #24 (step S172). The determination preferably is made on the basis of the current wrap number held by the head position control unit 45. If it is determined that the current normal wrap is none of wraps #52, #10, and #24, then the process proceeds to step S175, discussed further herein. Conversely, if it is determined that the current normal wrap is any one of wraps #52, #10, and #24, then the write position comparison unit 48 reads out from the write position storage unit 47 the wrap number and LPOS information stored in such a manner that these pieces of information are associated with the number of the data set (step S173).

Subsequently, the write position comparison unit 48 determines whether the wrap number of the position where the wrap number read out in step S173 is the number of the ABF wrap corresponding to the current normal wrap and whether the LPOS information read out in step S173 indicates the vicinity of the write position determined in step S171 (step S174). It is preferable to predetermine the length of a data set in a case where a maximum error occurs, to assume that the data set is written from the write position by the length, and to determine whether, if the data set reaches the top of a data set corresponding to LPOS information, the LPOS information indicates the vicinity of the write position.

If it is determined that the wrap number read out in step S173 is the wrap number of the ABF wrap corresponding to the current normal wrap and that the LPOS information read out in step S173 indicates the vicinity of the write position determined in step S171, then the write position comparison unit 48 notifies the host 30 that an error has occurred (step S180). More specifically, the write position comparison unit 48 notifies the buffer control unit 42 that the data set cannot be written, the buffer control unit 42 sends such notification to the command processing unit 41, and the command processing unit 41 notifies the host 30 that an error has occurred.

Conversely, if it is determined that the wrap number read out in step S173 is not the wrap number of an ABF wrap corresponding to the current normal wrap or that the LPOS information read out in step S173 does not indicate the vicinity of the write position determined in step S171, then the write position comparison unit 48 transfers control to the buffer control unit 42, the buffer control unit 42 writes the data set (step S175). More specifically, the buffer control unit 42 instructs the tape travel control unit 46 to output a signal to the motor driver 18 for causing the tape 23 to travel at a speed for writing data. Moreover, the buffer control unit 42 reads out the data set from the buffer 12 and passes the read-out data set to the channel input/output unit 43. Then, the channel input/output unit 43 writes the data set on the tape 23 via the write head 14*a*.

At that time, the buffer control unit 42 acquires the wrap number of the position where the data set has been written from the head position control unit 45, acquires LPOS information about the position where the data set has been written from the channel input/output unit 43, and stores the data set number and these pieces of information in the write position storage unit 47 in such a manner that the data set number and these pieces of information are associated with each other (step S176). Note that as described above, even if not all pieces of data constituting a data set are available at the time of a flush, available pieces of data are written on an ABF wrap, and at the time of a subsequent flush, data is added to the data set, and the resultant data set is written on the ABF wrap. In such case, the information stored comprises only the wrap number and LPOS information of the position where the largest number of pieces of the data set has been written. That is to say, the updated write position are stored in such a manner that these pieces of information are associated with the number of the data set.

Subsequently, the buffer control unit 42 determines whether there is another data set in the buffer 12 (step S177). If it is determined that there is no data set in the buffer 12, then the tape drive 10 completes the operations (END step). Conversely, if it is determined that there is another data set in the buffer 12, then the buffer control unit 42 determines whether the data set can be written on the same wrap (step S178). More specifically, the buffer control unit 42 makes such determination on the basis of LPOS information about the current position acquired by the channel input/output unit 43.

If in step S178 the buffer control unit 42 determines that the data set can be written on the same wrap, then the process returns to step S171. Conversely, if the buffer control unit 42 determines that the data cannot be written on the same wrap, then the buffer control unit 42 transfers control to the head position control unit 45, and the head position control unit 45 changes the wrap (step S179). More specifically, the head position control unit 45 outputs a signal to the head position control system 17 for positioning the write head 14*a* on another normal wrap. After the wrap change, the process returns to step S171.

In accordance with the second embodiment, after the data set is written, the wrap number and LPOS information of the position where the data set has been written are stored in steps S153 and S176. It should be noted that the wrap number and LPOS information stored previously may be used when writing a data set. In such case, when writing a data set, the wrap number and LPOS information stored previously are copied to another area in the ring buffer. Then, it is preferable to prevent overwriting of a data set having data that has yet to be rewritten on a normal wrap by referring to the copied information when rewriting data once written on the ABF wrap on the normal wrap.

Furthermore, in accordance with the second embodiment, if it is determined in step S174 that the data set cannot be overwritten, then as mentioned above the host 30 is notified that an error has occurred in step S180. However, the process performed after such determination is not limited to such notification. For example, a position of a data set that has not been overwritten, that has data yet to be rewritten on a normal wrap, and that is among data sets written on the ABF wrap may be searched for, and then the data set to be rewritten may be written in such position. However, if such a position is not found, the host 30 is notified that an error has occurred.

The various embodiments described herein assume the tape format as shown in FIG. 2 and the order of use of the normal wraps and assignment of the ABF wraps and guard band wraps as shown in FIG. 3. However, even if the above-described tape format, wrap use order, or the like is not used, the various embodiments nonetheless are applicable. For example, the various embodiments are applicable to a tape medium comprising at least a first track for writing first data temporarily, a second track for writing second data temporarily, a third track for subsequently writing the first data and second data normally, a fourth track for a normal write to be used after the third track, and a center area interposed between the first and second tracks.

Moreover, the various embodiments described herein are applicable to a tape medium comprising at least a first track for a write that does not cause a back hitch in a first direction, a second track for a write that does not cause a back hitch in a second direction reverse to the first direction, a third track for a write in the first direction that is adjacent to the first track and on a side opposite to the second track, a fourth track to be used after the third track for a write in the second direction that is adjacent to the second track and on a side opposite to the first track, and a center area interposed between the first and second tracks.

In accordance with the various embodiments described herein, data set DS#X+2 is used as an example of the aforementioned first data, and data set DS#X+5 is used as an example of the aforementioned second data. Also, the forward direction is used as an example of the aforementioned first direction and the reverse direction is used as an example of the aforementioned second direction. Also, wrap #54 is used as an example of the aforementioned first track, wrap #55 is used as an example of the aforementioned second track, wrap #52 is used as an example of the aforementioned third track, wrap #53 is used as an example of the aforementioned fourth track, and the band center is used as an example of the aforementioned center area.

The various embodiments described herein may be realized solely by hardware or software. Alternately, the various embodiments may be realized by both hardware and software. That is, the various embodiments may be realized by any of a computer, a data processing system, and a computer program. Such computer program may be stored in a computer-readable medium and provided. Among such computer-readable media are electronic media, magnetic media, optical media, electromagnetic media, infrared or semiconductor systems (devices), and propagation media. More specifically, computer-readable media include semiconductors or solid state storage devices, magnetic tapes, detachable computer diskettes, random access memories (RAMs), read-only memories (ROMs), rigid magnetic disks, and optical disks. Among currently available optical disks are compact disc-read only memories (CD-ROMs), compact disc-read/write (CD-R/W), and digital versatile discs (DVDs).

While the various embodiments have been described with reference to the exemplary embodiments provided herein, the technical scope of the various embodiments is not limited thereto. It will be apparent for those skilled in the art that various changes can be made or various substitutes therefor can be used without departing from the spirit and scope of the various embodiments.

The invention claimed is:

1. An apparatus comprising:
    a write unit configured for writing first data accumulated in a buffer on a tape medium in a first position extending over a first track and an area adjacent to the first track, writing second data accumulated in the buffer on the tape medium in a second position extending over a second track and an area adjacent to the second track, and writing the first data and the second data in a third position extending over a third track and an area adjacent to the third track; and
    a processing unit configured for preventing the first data written in the first position from being overwritten with the first data written in the third position by, before the first data is written in the third position, determining whether the first data written in the first position is to be overwritten with the first data written in the third position.

2. The apparatus according to claim 1, wherein the write unit writes temporary data on the first track and the second track, and wherein the write unit writes normal data on the third track.

3. The apparatus according to claim 2, wherein the write unit writes temporary data on the first track and the second track to prevent a back hitch.

4. The apparatus according to claim 1, wherein the processing unit is further configured for reporting a write error upon determining that the first data written in the first position by the write unit is to be overwritten with the first data written in the third position by the write unit.

5. A method comprising:
    writing first data accumulated in a buffer on a tape medium in a first position extending over a first track and an area adjacent to the first track;
    writing second data accumulated in the buffer on the tape medium in a second position extending over a second track and an area adjacent to the second track;
    preventing the first data written in the first position from being overwritten with the first data written in a third position extending over a third track and an area adjacent to the third track by, before the first data is written in the third position, determining whether the first data written in the first position is to be overwritten with the first data written in the third position; and
    upon determining that the first data written in the first position is not to be overwritten with the first data written in the third position, writing the first data and the second data in the third position.

6. The method according to claim 5, wherein the first data written in the first position is temporary data, wherein the second data written in the second position is temporary data, and wherein the first data and the second data written in the third position is normal data.

7. The method according to claim 6, wherein the first data is written in the first position and the second data is written in the second position to prevent a back hitch.

8. The method according to claim 5, further comprising reporting a write error upon determining that the first data written in the first position is to be overwritten with the first data written in the third position.

9. An apparatus comprising:
    a write unit configured for writing first data accumulated in a buffer on a tape medium in a first position extending over a first track and an area adjacent to the first track, writing second data accumulated in the buffer on the tape medium in a second position extending over a second track and an area adjacent to the second track, and writing the first data and the second data in a third position extending over a third track and an area adjacent to the third track; and a processing unit configured for preventing the first data written in the first position by the write unit from being overwritten with the second data written in the second position by interposing the second track between an area adjacent to the first track and a fourth track used subsequent to the third track, and by setting the second position at a position extending over the second track and the fourth track.

10. The apparatus according to claim 9, wherein the write unit writes temporary data on the first track and the second track, and wherein the write unit writes normal data on the third track.

11. The apparatus according to claim 9, wherein the write unit writes normal data on the fourth track.

12. The apparatus according to claim 9, further comprising a read unit configured for reading out data from an area adjacent to the first track in response to a request to read out data from the first track.

13. The apparatus according to claim 9, wherein the processing unit is further configured for setting the second position at a position extending over the second track and the fourth track upon determining that the third position is a position extending over the third track and the first track.

14. A method comprising:

writing first data accumulated in a buffer on a tape medium in a first position extending over a first track and an area adjacent to the first track;

writing second data accumulated in the buffer on the tape medium in a second position extending over a second track and an area adjacent to the second track;

writing the first data and the second data in a third position extending over a third track and an area adjacent to the third track; and preventing the first data written in the first position from being overwritten with the second data written in the second position by interposing the second track between an area adjacent to the first track and a fourth track used subsequent to the third track, and by setting the second position at a position extending over the second track and the fourth track.

15. The method according to claim 14, wherein the first data written in the first position is temporary data, wherein the second data in the second position is temporary data, and wherein the first data and the second data written in the third position is normal data.

16. The method according to claim 14, wherein data written on the fourth track is normal data.

17. The method according to claim 14, further comprising reading out data from an area adjacent to the first track in response to a request to read out data from the first track.

18. The method according to claim 14, further comprising setting the second position at a position extending over the second track and the fourth track upon determining that the third position is a position extending over the third track and the first track.

* * * * *